(12) United States Patent
Yan et al.

(10) Patent No.: US 12,349,038 B2
(45) Date of Patent: Jul. 1, 2025

(54) SYSTEMS AND METHODS FOR USER EQUIPMENT ROUTE SELECTION POLICY REVALIDATION

(71) Applicant: Verizon Patent and Licensing Inc., Basking Ridge, NJ (US)

(72) Inventors: Lixia Yan, Basking Ridge, NJ (US); Violeta Cakulev, Milburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 337 days.

(21) Appl. No.: 18/061,702

(22) Filed: Dec. 5, 2022

(65) Prior Publication Data
US 2024/0187958 A1     Jun. 6, 2024

(51) Int. Cl.
*H04W 40/02*     (2009.01)

(52) U.S. Cl.
CPC ................... *H04W 40/02* (2013.01)

(58) Field of Classification Search
None
See application file for complete search history.

(56) References Cited

U.S. PATENT DOCUMENTS

| | | | |
|---|---|---|---|
| 11,469,994 B2 * | 10/2022 | Wang | H04W 40/20 |
| 2020/0351409 A1 * | 11/2020 | Karampatsis | H04W 76/30 |
| 2022/0210698 A1 * | 6/2022 | Ly | H04W 40/22 |
| 2023/0354143 A1 * | 11/2023 | Schumacher | H04L 45/74 |

* cited by examiner

*Primary Examiner* — Brian S Roberts

(57) ABSTRACT

In some implementations, a network device may obtain a message that includes service parameter data associated with an application. The service parameter data may indicate a revalidation time. The network device may generate, based on the service parameter data, a user equipment route selection policy (URSP) rule associated with the application that includes the revalidation time indicated by the service parameter data. The URSP rule may expire at the revalidation time. The network device may transmit the URSP rule for a user equipment (UE) that executes the application. The network device may receive a state indication message associated with the UE that is triggered at the revalidation time.

20 Claims, 5 Drawing Sheets

SYSTEMS AND METHODS FOR USER EQUIPMENT ROUTE SELECTION POLICY REVALIDATION

BACKGROUND

A policy control function (PCF) may provide protocol data unit (PDU) session management policy control information to a session management function (SMF), may provide access and mobility related policy control information to an access and mobility management function (AMF), and may provide user equipment (UE) access selection and PDU session related policies to a UE.

DETAILED DESCRIPTION OF EXAMPLE EMBODIMENTS

Figure 1A:
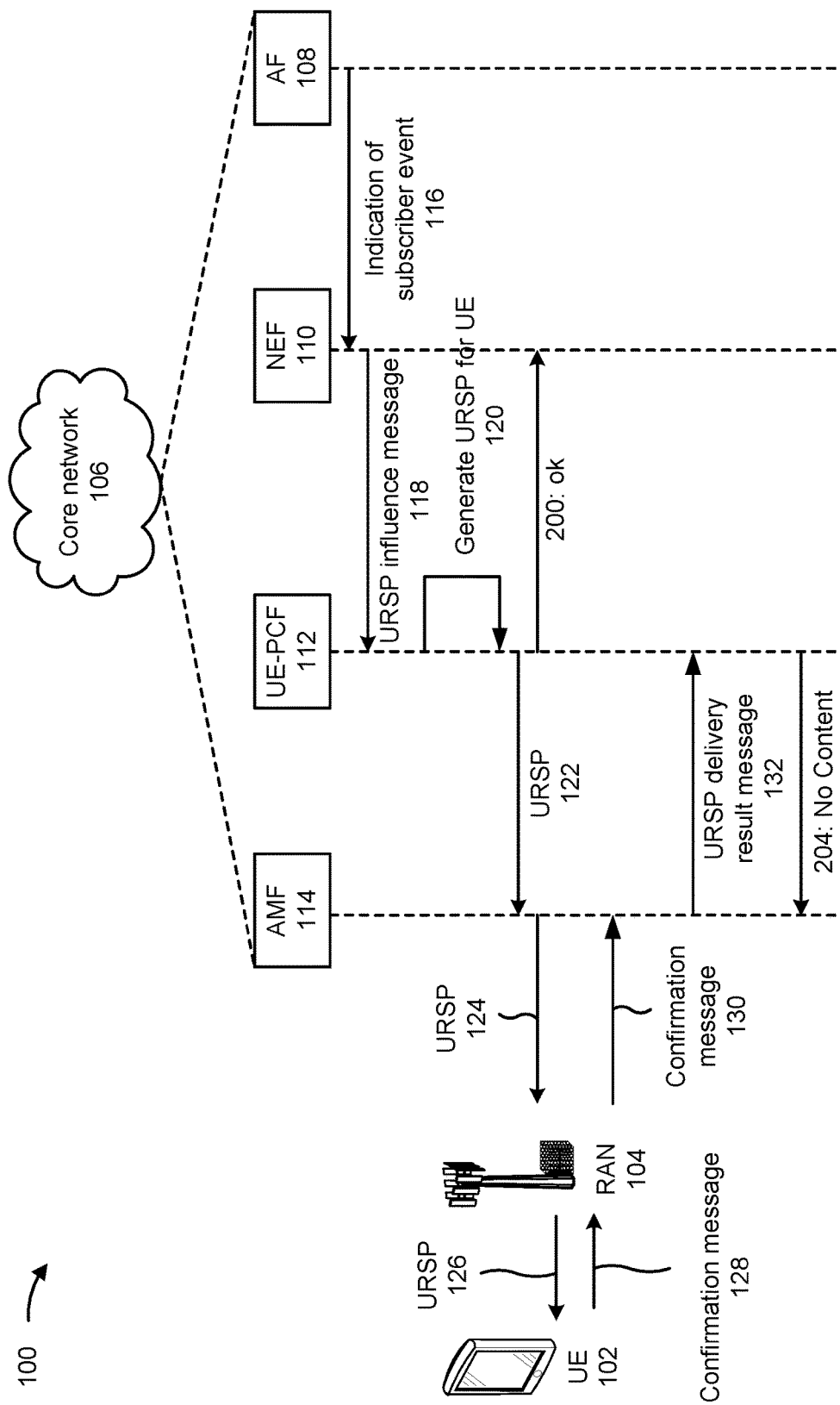
FIGS. 1A-1B are diagrams of an example associated with UE route selection policy (URSP) revalidation.

The following detailed description of example implementations refers to the accompanying drawings. The same reference numbers in different drawings may identify the same or similar elements.

A core network device, such as a policy control function (PCF), may provide policy information for a user equipment (UE). For example, the core network device may provide a UE route selection policy (URSP) to a UE via service-based interface (SBI) interactions and non-access stratum (NAS) signaling. The UE may use the URSP to determine how to route outgoing traffic. For example, the UE may use the URSP to determine whether traffic associated with an application can be sent on an established protocol data unit (PDU) session, can be offloaded to non-3rd Generation Partnership Project (non-3GPP) access outside a PDU session, and/or can be used to trigger the establishment of a new PDU session.

In some cases, the URSP may be pre-configured with the UE and/or signaled to the UE by a home public land mobile network (HPLMN). The pre-configured URSP, the signaled URSP, and/or a subscription permanent identifier (SUPI) from a universal subscriber identity module (USIM) may be stored in a non-volatile memory of the UE. The URSP may be stored in the non-volatile memory of the UE until a new URSP is configured by the HPLMN and/or until the USIM is removed from the non-volatile memory or the UE.

The URSP may include one or more URSP rules, and each URSP rule may include a UE policy section identifier (UPSI), a precedence value, traffic descriptors, and/or route selection descriptors. The UPSI may include a public land mobile network identifier (PLMN ID) for the PLMN of the core network device that provides the URSP for the UE and a UE policy section code (UPSC) that includes a unique value within the PLMN that is determined by the core network device. The core network device may use the UPSIs and the UPSCs to identify URSP rules when making changes to a URSP (e.g., when adding, modifying, and/or deleting a URSP rule associated with the URSP).

The precedence value may identify a precedence of the URSP rule among all the existing URSP rules, and the UE may enforce the URSP rules based on the precedence values. For example, the UE may enforce a URSP rule having a higher precedence value relative to a URSP rule that has a lower precedence value. The traffic descriptors may be used to identify traffic associated with an application, such as a flow of traffic associated with the application. As an example, the traffic descriptors may include application descriptors (e.g., an operating system identifier (OSId) and/or an OS application identifier (OSAppId)), internet protocol (IP) descriptors (e.g., IP address, IPv6 network prefix, port number, protocol ID, security parameter index type, type of service, type of traffic class type, and/or a flow label type), domain descriptors (e.g., destination fully qualified domain names (FQDNs) and/or a regular expression as a domain name matching criteria), non-IP descriptors, data network names (DNNs), and/or connection capabilities. The UE may use the traffic descriptors to identify an application and/or an application type, such as a streaming video application and/or a productivity application.

The one or more route selection descriptors may include information for establishing a data session for an application and/or for routing traffic associated with the application. As an example, the one or more route selection descriptors may include session and service continuity (SSC) mode information, network slice selection information, data network (DNN) information, PDU session type selection information, non-seamless offload indication information, access type preference information, location criteria type information, and/or time window type information.

Thus, the core network device may use URSP policies to control traffic, such as traffic associated with an application. For example, the core network device may use a URSP policy that includes a URSP rule to route traffic over a normal network slice (e.g., a first network slice). In some cases, the traffic associated with the application may need to be routed over a normal network slice for a first time period and routed over a low latency network slice (e.g., a second network slice) for a second time period. However, to control the traffic associated with the application during the first time period and the second time period, the core network device typically needs to provide a first URSP that includes a first URSP rule to route traffic during the first time period and a second URSP that includes a second URSP rule to route traffic during the second time period. In some cases, the core network device provides the first URSP to the UE, monitors and/or tracks an expiration of the first time period, and initiates a URSP update procedure (e.g., a UE configuration update procedure) based on the expiration of the first time period to replace the first URSP with the second URSP.

Thus, current techniques for providing URSPs to UEs, such as providing URSPs that include time-based rules to UEs, consume resources (e.g., computing resources, memory resources, and/or networking resources) associated with monitoring and/or tracking time-based URSPs and initiating URSP policy change requests to UEs.

Some implementations described herein provide techniques that enable time-conditioned influence of a USRP for a UE and that enable a UE to initiate communications with the core network device based on a trigger associated with the URSP provided to the UE. For example, a core network device, such as a PCF for a UE (UE-PCF), may obtain a message that indicates a revalidation time associated with an application. The core network device may generate URSP rule associated with the application that expires at the revalidation time. As an example, the core network device may transmit the URSP for the UE that executes the application, and the core network device may receive a state indication message associated with the UE that is triggered at the revalidation time. In this way, the implementations described herein consume fewer resources at the core network device and fewer over-the-air network resources by removing a need to monitor and/or track time associated with time-conditioned URSP rules and/or by removing a need to transmit requests for policy changes associated with UEs.

Figure 1B:
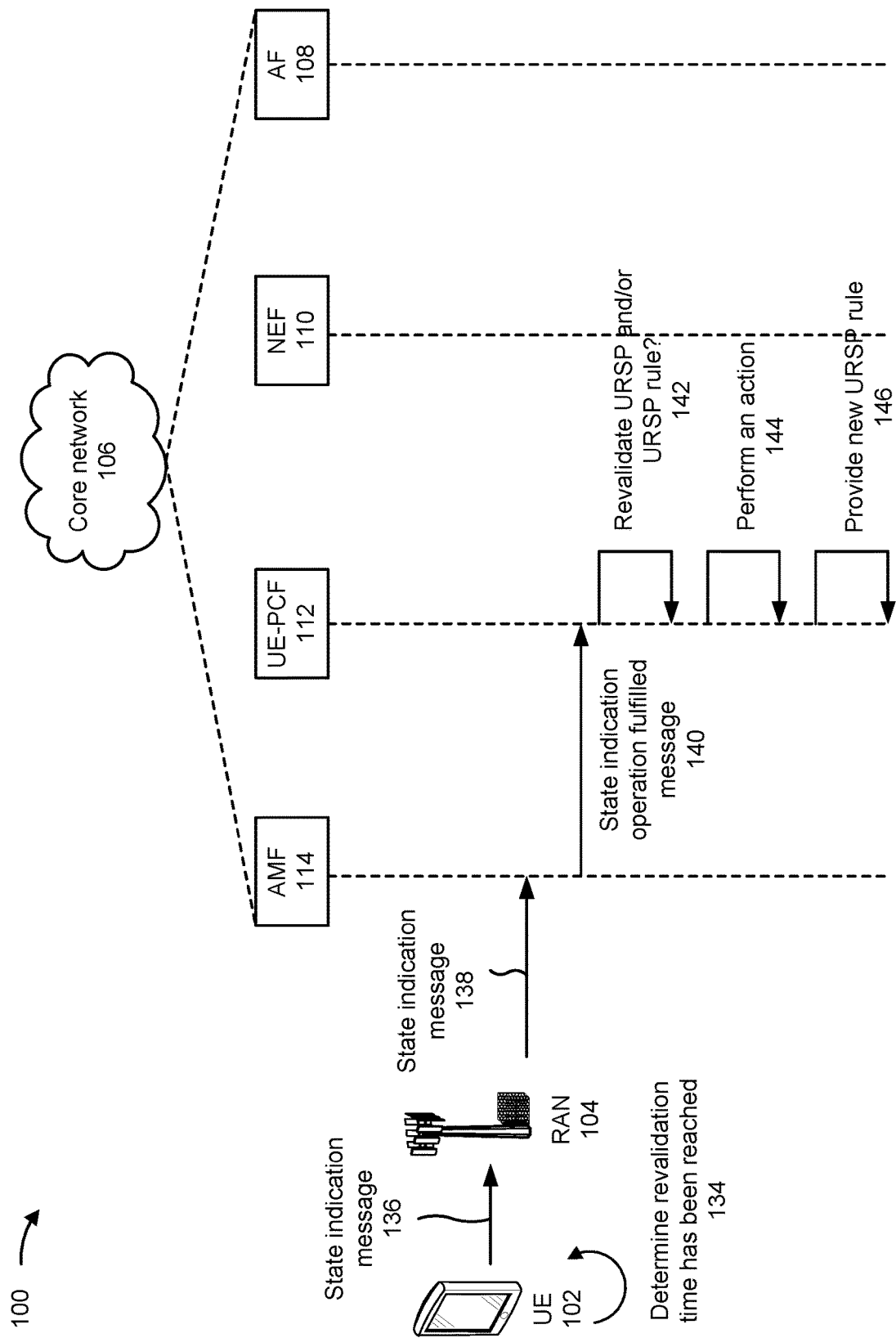

FIGS. 1A-1B are diagrams of an example 100 associated with URSP revalidation. As shown in FIGS. 1A-1B, example 100 includes a UE 102 associated with a radio access network (RAN) 104 and a core network 106 that includes an application function (AF) 108, a network exposure function (NEF) 110, a UE-PCF 112, and an AMF 114.

As shown in FIG. 1A, and by reference number 116, the AF 108 may provide, and the NEF 110 may receive, an indication of a subscriber event. In some implementations, the indication of the subscriber event may be an AF communication (e.g., an AF request) that influences traffic routing associated with an application. As an example, the subscriber event may be an event that changes subscriber data associated with how the application routes traffic, and the AF 108 may provide the indication of the subscriber event to the NEF 110 based on the changes to the subscriber data. In some implementations, the changes to the subscriber data may be associated with a unified data management (UDM) component, a unified data repository (UDR), and/or a charging function (CHF) associated with the UE 102.

As an example, the subscriber event may be associated with an application (e.g., executing on or installed on the UE 102), such as a cloud gaming application that offers different service level options. For example, the cloud gaming application may offer a normal latency service level option (e.g., the cloud gaming application traffic is routed through a normal network slice) and a low latency service level option (e.g., the cloud gaming application traffic is routed through a low latency network slice). The normal latency service level option may be a default service level option that is available to the UE 102 at no additional cost (e.g., based on a current or existing subscription associated with the UE 102), and the low latency service level option may be a premium service level option that is available to the UE 102 for an additional cost (e.g., beyond a cost of a current or existing subscription associated with the UE 102).

As an example, the UE 102 may be associated with purchase of a token (e.g., by a user of the UE 102) associated with the low latency service level option that enables the UE 102 to use the cloud gaming application over the low latency network slice for a time period (e.g., the UE 102 may purchase a $5.00 token that enables the UE 102 to use the cloud gaming application over the low latency network slice for two hours). In this example, the subscriber event may be associated with the purchase of the token associated with the UE 102 because the purchase of the token changes subscriber data (e.g., subscriber price data and subscriber traffic routing associated with the cloud gaming application). In other words, the UE 102 is associated with a $5.00 charge, and the cloud gaming application traffic is routed over the low latency network slice rather than the normal network slice based on the purchase of the token for the UE 102, which causes the subscriber data associated with the UE 102 to change.

In some implementations, the AF 108 may update, based on the subscriber event, the subscriber data associated with the UE 102 to indicate the change(s) to the subscriber data, such as by updating a UDR profile of the UDR and/or a charging profile of the CHF associated with the UE 102. In some implementations, the AF 108 may generate service parameter data based on the subscriber event. As an example, the service parameter data may indicate a unique identifier, one or more quality of service (QoS) requirements, and/or a revalidation time associated with the subscriber event. In some implementations, the revalidation time may be based on a time period associated with the subscriber event and may trigger the UE 102 to provide a state indication message for the UE-PCF 112 (e.g., at an indicated time), as described in more detail elsewhere herein.

In the example described in connection with FIGS. 1A-1B, the AF 108 may generate service parameter data to indicate an application identifier associated with the cloud gaming application (e.g., appID=cloud gaming application), a QoS requirement of routing the traffic associated with the cloud gaming application over the low latency network slice, and a revalidation time based on the two hour time period associated with the subscriber event (e.g., the revalidation time is a time when the two hour period expires). Thus, in some implementations, the revalidation time may be indicated as an expiration time associated with the subscriber event.

As an example, the service parameter data may indicate that the traffic associated with the cloud gaming application is to be routed over the low latency network slice until the revalidation time, and, at the revalidation time, the UE 102 may be triggered to provide the state indication message for the UE-PCF 112, as described below. Thus, the service parameter data may indicate a revalidation time at which the UE 102 is to transmit the state indication message.

As shown by reference number 118, the NEF 110 may provide, and the UE-PCF 112 may receive, a URSP influence message. In some implementations, the URSP influence message may be based on the service parameter data. As an example, the NEF 110 may provide the URSP influence message as a Hypertext Transfer Protocol (HTTP) POST message to the UE-PCF 112 that includes the unique identifier and the revalidation time indicated by the service parameter data. For example, the URSP influence message may indicate the unique identifier as "appID=cloud gaming application" and the revalidation time as "revalidation-timestamp=current time plus two hours." As shown in FIG. 1A, the UE-PCF 112 may provide an HTTP status code of "200: ok" to the NEF 110 to indicate that the URSP influence message was successfully received by the UE-PCF 112.

As shown by reference number 120, the UE-PCF 112 may generate a URSP for the UE 102. In some implementations, the UE-PCF 112 may delete a current URSP associated with the UE 102 and may generate a new URSP for the UE 102 based on the URSP influence message. For example, the current URSP may include a current URSP rule that routes traffic associated with the gaming application over a normal network slice. The UE-PCF 112 may delete the current URSP rule and may generate a different URSP rule (e.g., a new URSP rule) based on the URSP influence message.

As an example, the different URSP rule may indicate the unique identifier as a traffic descriptor (e.g., "TrafficDescriptor (appID=x)"), may indicate a route selection descriptor as a low latency network slice (e.g., "RouteSelectionDescriptor (S-NSSAI=LowLatencySlice)"), and may indicate the revalidation time as an expiration time associated with the subscriber event (e.g., "revalidation time=expiration time associated with the subscriber event"). In this way, the time that the different URSP rule expires (e.g., is not valid) may be indicated.

As another example, the revalidation time may be indicated as an expiration time associated with a time period defined by a time and a time period, such as a timestamp plus an additional time period (e.g., "revalidation-timestamp=current time plus two hours"). In this way, a full time range where the different URSP rule is valid may be indicated. Thus, in some implementations, the different URSP rule may expire at the revalidation time, and the UE 102 may provide a state indication message to obtain a different URSP rule and/or a new URSP rule from UE-PCF 112. In some implementations, the UE-PCF 112 may provide the URSP for the UE 102 by using a UE configuration update procedure, as described in more detail elsewhere herein.

As shown by reference number 122, the UE-PCF 112 may provide, and the AMF 114 may receive, the URSP generated by the UE-PCF 112. In some implementations, the URSP may include a UPSC (e.g., "UPSC=10000") that identifies the URSP rule and may include the revalidation time that indicates a time that the UE 102 is triggered to provide the state indication message. In some implementations, the UE-PCF 112 may provide the URSP to the AMF 114 via an N1N2 message transfer request call flow message. As shown by reference number 124, the AMF 114 may transmit (e.g., may forward) the URSP to the RAN 104. As an example, the AMF may transit (e.g., may forward) the URSP to the RAN 104 via a MANAGE UE POLICY COMMAND message.

As shown by reference number 126, the RAN 104 may transmit (e.g., may forward) the URSP to the UE 102. As an example, the RAN 104 may transmit (e.g., may forward) the URSP to the UE 102 via a MANAGE UE POLICY COMMAND message. As shown by reference number 128, the UE 102 may provide a confirmation message to the RAN 104 that confirms that the URSP was successfully received by the UE 102. As an example, the UE 102 may provide the confirmation message to the RAN 104 via a MANAGE UE POLICY COMPLETE message.

As shown by reference number 130, the RAN 104 may transmit (e.g., may forward) the confirmation message to the AMF 114. As an example, the RAN 104 may transmit (e.g., may forward) the confirmation message to the AMF 114 via a MANAGE UE POLICY COMPLETE message. As shown by reference number 132, the AMF 114 may provide a URSP delivery result message, that confirms that the UE 102 has received the URSP, to the UE-PCF 112. As an example, the AMF 114 may deliver the URSP delivery result message via an N1 message notification. As shown in FIG. 1A, the UE-PCF 112 may provide an HTTP status code of "204: No Content" to the AMF 114 to indicate that the URSP was successfully updated.

As shown in FIG. 1B, and by reference number 134, the UE 102 may determine that the revalidation time has been reached (e.g., that a current time, as measured by the UE 102, has reached or surpassed the revalidation time). For example, if the UE 102 receives a revalidation time indicated as "revalidation-timestamp=current time plus two hours," then the UE 102 may determine that the revalidation time is a time at which the time period indicated by the revalidation time expires (e.g., an elapsed time period of two hours).

As shown by reference number 136, the UE 102 may provide a UE state indication message to the RAN 104. In some implementations, the UE 102 may provide the UE state indication message to the RAN 104 based on determining that the revalidation time has been reached. In this way, the UE-PCF 112 may initiate a URSP update procedure (e.g., a UE configuration update procedure) in response to receiving the UE state indication message (e.g., at a specific time indicated by the UE-PCF 112) without having to track a time period associated with the specific time (e.g., because the UE 102 monitors the revalidation time as opposed to the UE-PCF 112). Furthermore, the UE-PCF 112 need not transmit a message to the UE 102 upon determining that the revalidation time has been reached, thereby conserving network resources.

As shown by reference number 138, the RAN 104 may transmit (e.g., forward) the state indication message to the AMF 114. As an example, the RAN 104 may transmit (e.g., forward) the state indication message to the AMF 114 via a UE state indication message. As shown by reference number 140, the AMF 114 may provide a state indication operation fulfilled message to the UE-PCF 112.

As shown by reference number 142, the UE-PCF 112 may determine whether to revalidate the URSP and/or the URSP rule. In some implementations, the UE-PCF 112 may determine that the URSP rule is expired based on a current time being later than the revalidation time. As an example, if the different URSP rule indicates the unique identifier as a traffic descriptor of "appID=cloud gaming application," indicates the route selection descriptor as "RouteSelectionDescriptor (S-NSSAI=LowLatencySlice)," and indicates the revalidation time as "revalidation-timestamp=1:00 pm plus 2 hours," then the UE-PCF 112 112 may determine that the different URSP rule is expired (e.g., not valid) based on determining that a current time is 3:01 pm (e.g., 3:01 pm is later than 3:00 pm, or 1:00 pm plus 2 hours). Thus, the UE 102 associated with the cloud gaming application may route traffic over a low latency network slice from 1:00 pm to 3:00 pm before being triggered at 3:00 pm (or 3:01 pm, or the like) to provide a UE state indication for the UE-PCF 112. The UE-PCF 112 may determine whether to revalidate the new URSP and/or the new USRP rule based on the UE state indication message.

As shown by reference number 144, the UE-PCF 112 may perform an action based on determining whether to revalidate the new URSP and/or the different URSP rule. In some implementations, the UE-PCF 112 may delete the different URSP rule based on determining that the different URSP rule is expired and may generate a new URSP rule. In some implementations, UE-PCF 112 may use a new UPSC (e.g., 10001) to identify the new URSP rule. In some implementations, the UE-PCF 112 may analyze subscriber information associated with the UE 102, such as the subscriber data associated with the UDM, the UDR, and/or the CHF, and may generate the new URSP rule based on the subscriber data. As an example, the UE-PCF 112 may analyze subscriber data that indicates that traffic associated with an application is to be routed over a normal latency network slice, and the UE-PCF 112 may generate the new URSP rule to include a route selection descriptor that routes traffic associated with the application over a normal latency network slice. Thus, in some implementations, the new URSP rule may be associated with one or more QoS parameters that are different than QoS parameters associated with the previous URSP rule.

In some implementations, the previous URSP rule may include a first one or more route selection descriptors that influence traffic routing associated with the application, and the UE-PCF 112 may generate the new URSP rule that includes a second one or more route selection descriptors that influence traffic routing associated with the application that are different than the first one or more route selection descriptors.

As shown by reference number 146, the UE-PCF 112 may provide the new URSP rule for the UE 102, as described above in connection with reference numbers 122-132 of FIG. 1A and elsewhere herein. In some implementations, the UE-PCF 112 may provide an HTTP status code of "204: No Content" to the AMF 114 based on determining that the URSP rule is to be revalidated.

In this way, the implementations described herein consume fewer resources at the core network device and fewer over-the-air network resources by removing a need to monitor and/or track time associated with time-conditioned URSP rules and/or by removing a need to transmit requests for policy changes associated with UEs.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
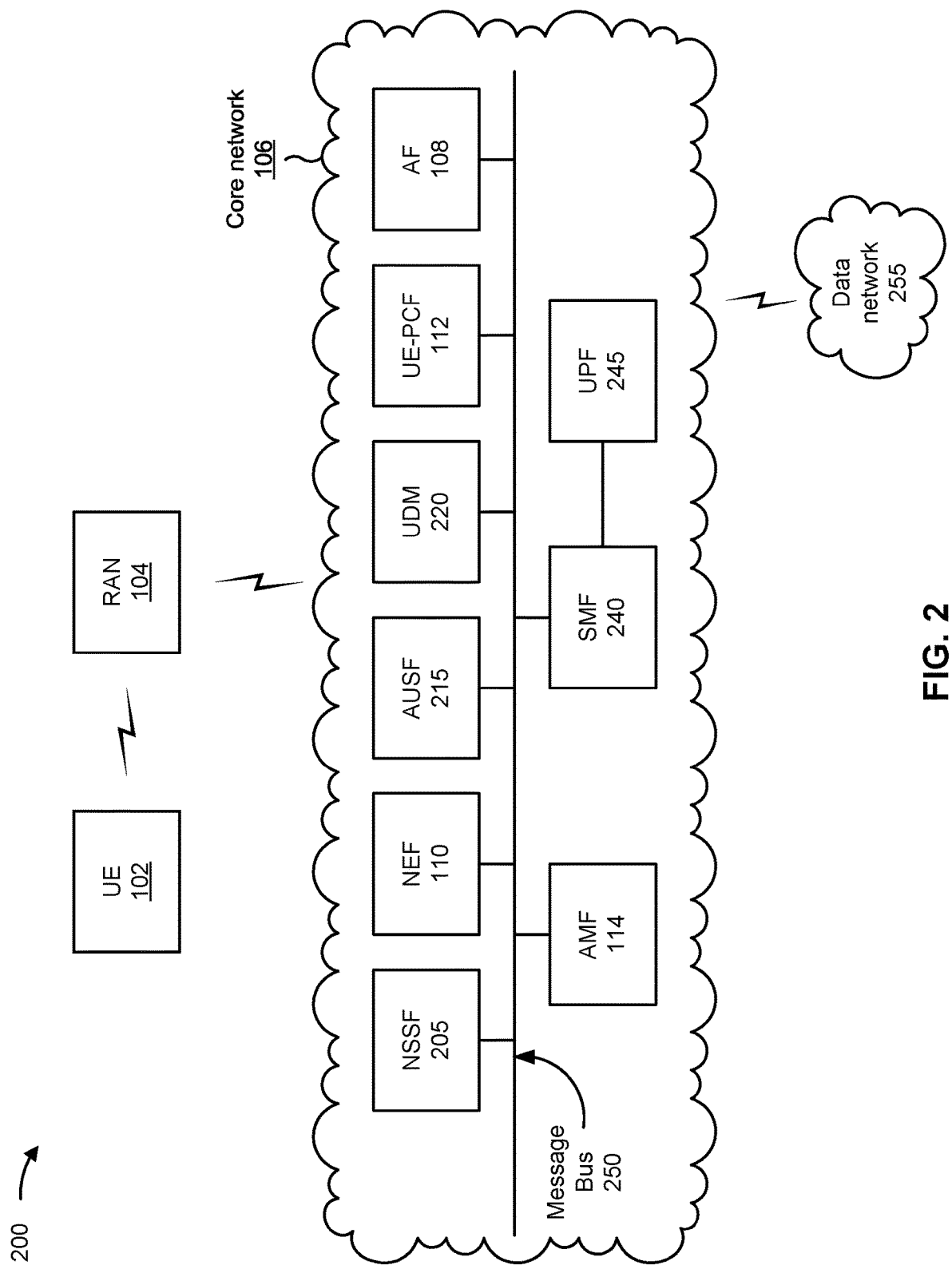
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include a UE 102, a RAN 104, a core network 106, and a data network 255. Devices and/or networks of example environment 200 may interconnect via wired connections, wireless connections, or a combination of wired and wireless connections.

UE 102 includes one or more devices capable of receiving, generating, storing, processing, and/or providing information, such as information described herein. For example, UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 104 may support, for example, a cellular radio access technology (RAT). RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 102. RAN 104 may transfer traffic between UE 102 (e.g., using a cellular RAT), one or more base stations (e.g., using a wireless interface or a backhaul interface, such as a wired backhaul interface), and/or core network 106. RAN 104 may provide one or more cells that cover geographic areas.

In some implementations, RAN 104 may perform scheduling and/or resource management for UE 102 covered by RAN 104 (e.g., UE 102 covered by a cell provided by RAN 104). In some implementations, RAN 104 may be controlled or coordinated by a network controller, which may perform load balancing, network-level configuration, and/or other operations. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of UE 102 covered by RAN 104).

In some implementations, core network 106 may include an example functional architecture in which systems and/or methods described herein may be implemented. For example, core network 106 may include an example architecture of a fifth generation (5G) next generation (NG) core network included in a 5G wireless telecommunications system. While the example architecture of core network 106 shown in FIG. 2 may be an example of a service-based architecture, in some implementations, core network 106 may be implemented as a reference-point architecture and/or a 4G core network, among other examples.

As shown in FIG. 2, core network 106 may include a number of functional elements. The functional elements may include, for example, a network slice selection function (NSSF) 205, a network exposure function (NEF) 110, an authentication server function (AUSF) 215, a unified data management (UDM) component 220, a UE policy control function (UE-PCF) 112, an application function (AF) 108, an access and mobility management function (AMF) 114, a session management function (SMF) 240, and/or a user plane function (UPF) 245. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 102. By providing network slicing, NSSF 205 allows an operator to deploy multiple substantially independent end-to-end networks potentially with the same infrastructure. In some implementations, each slice may be customized for different services.

NEF 110 includes one or more devices that support exposure of capabilities and/or events in the wireless telecommunications system to help other entities in the wireless telecommunications system discover network services.

AUSF 215 includes one or more devices that act as an authentication server and support the process of authenticating UE 102 in the wireless telecommunications system.

UDM 220 includes one or more devices that store user data and profiles in the wireless telecommunications system. UDM 220 may be used for fixed access and/or mobile access in core network 106.

UE-PCF 112 includes one or more devices that provide a policy framework that incorporates network slicing, roaming, packet processing, and/or mobility management, among other examples.

AF 108 includes one or more devices that support application influence on traffic routing, access to NEF 110, and/or policy control, among other examples.

AMF 114 includes one or more devices that act as a termination point for non-access stratum (NAS) signaling and/or mobility management, among other examples.

SMF 240 includes one or more devices that support the establishment, modification, and release of communication sessions in the wireless telecommunications system. For example, SMF 240 may configure traffic steering policies at UPF 245 and/or may enforce user equipment IP address allocation and policies, among other examples.

UPF 245 includes one or more devices that serve as an anchor point for intraRAT and/or interRAT mobility. UPF 245 may apply rules to packets, such as rules pertaining to packet routing, traffic reporting, and/or handling user plane QoS, among other examples.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
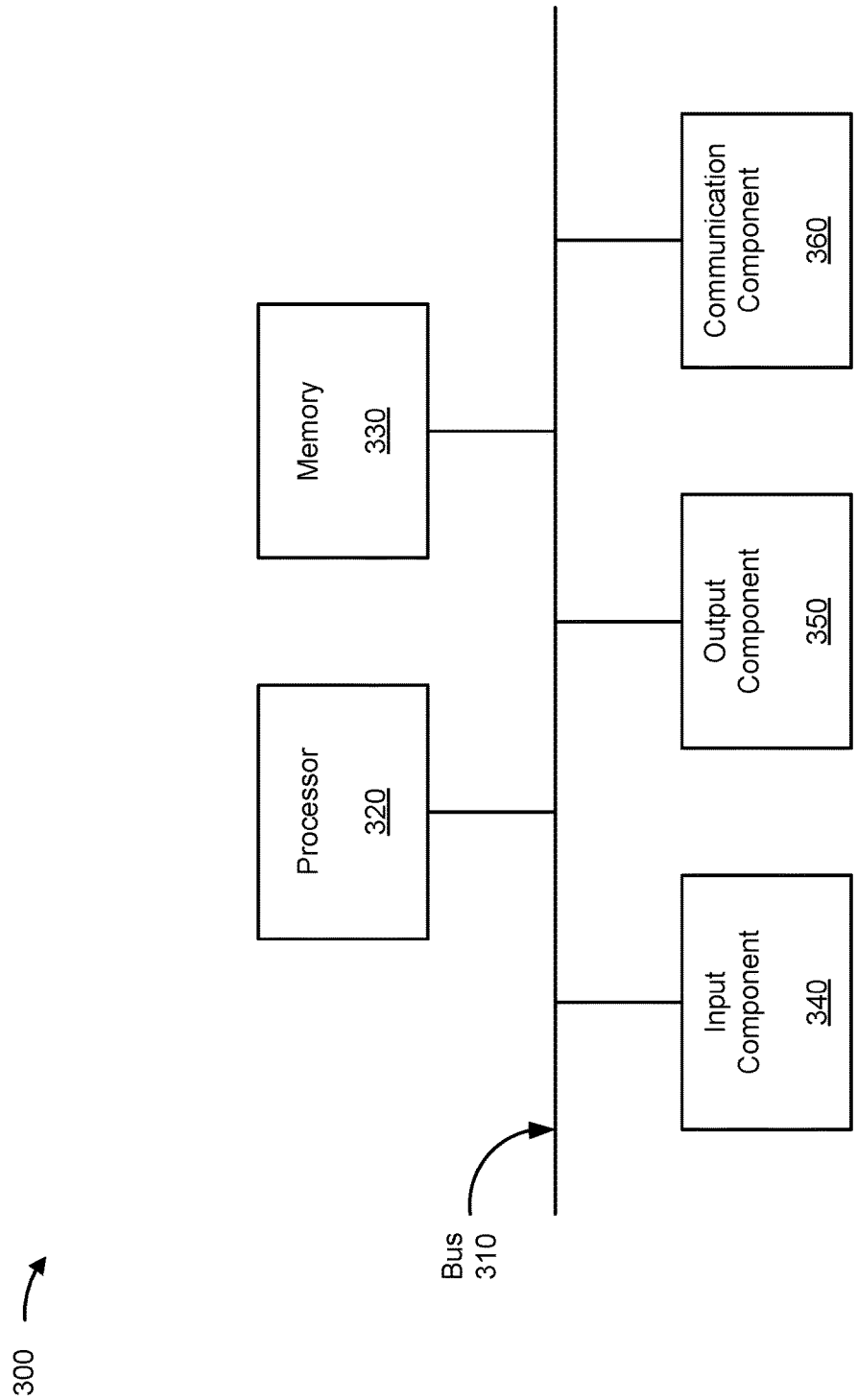
FIG. 3 is a diagram of example components of a device associated URSP revalidation.

FIG. 3 is a diagram of example components of a device 300 associated with systems and methods for URSP revalidation. The device 300 may correspond to UE 102, RAN 104, AF 108, NEF 110, UE-PCF 112, AMF 114, NSSF 205, NEF 110, AUSF 215, UDM component 220, SMF 240, and/or UPF 245. In some implementations, UE 102, RAN 104, AF 108, NEF 110, UE-PCF 112, AMF 114, NSSF 205, NEF 110, AUSF 215, UDM component 220, SMF 240, and/or UPF 245 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
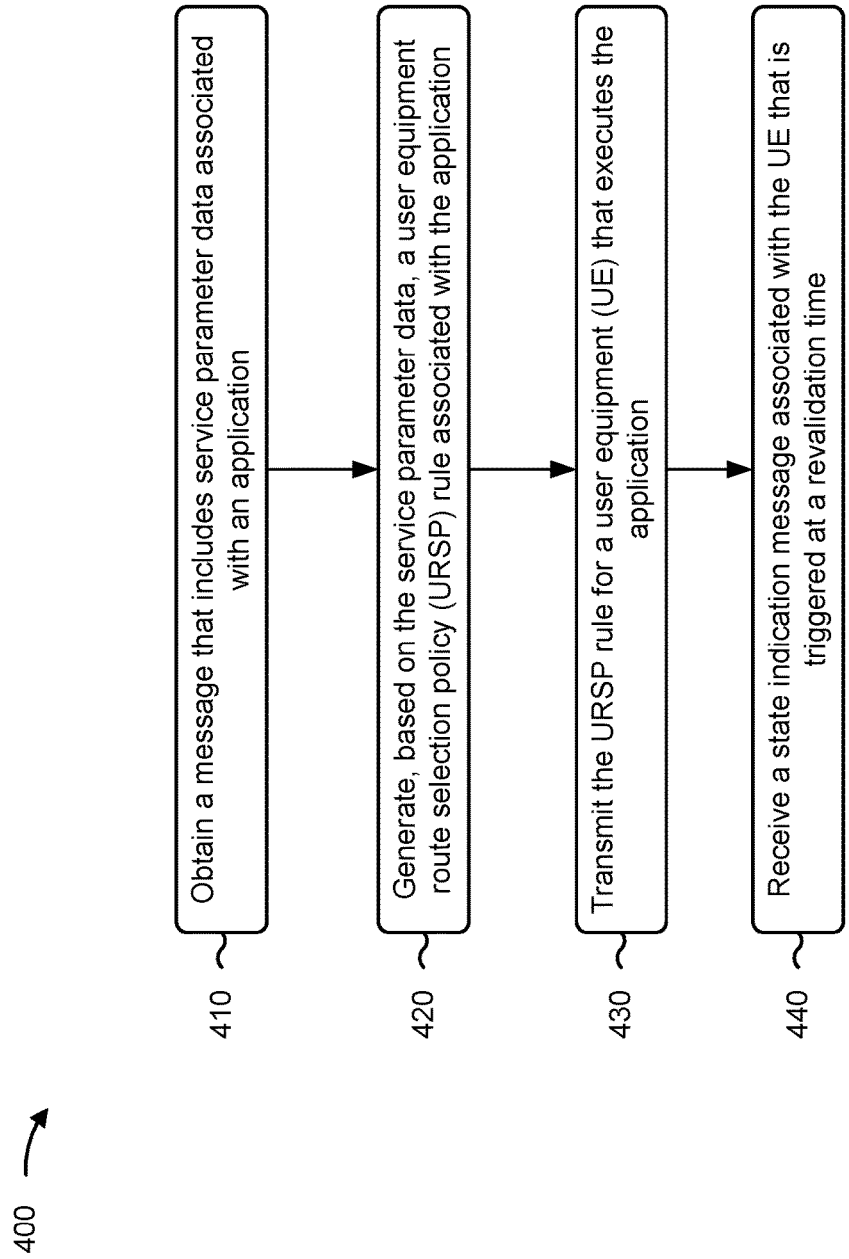
FIG. 4 is a flowchart of an example process associated with URSP revalidation.

FIG. 4 is a flowchart of an example process 400 associated with URSP revalidation. In some implementations, one or more process blocks of FIG. 4 may be performed by a core network device, such as a UE-PCF (e.g., UE-PCF 112). In some implementations, one or more process blocks of FIG. 4 may be performed by another device or a group of devices separate from or including the core network device, such as an NSSF (e.g., an NSSF 205), a NEF (e.g., NEF 110), an AUSF (e.g., AUSF 215), a UDM component (e.g., UDM component 220), a UE-PCF (e.g., UE-PCF 112), an AF (e.g., AF 108), an AMF (e.g., AMF 114), an SMF (e.g., SMF 240), and/or a UPF (e.g., UPF 245). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include obtaining a message that includes service parameter data associated with an application (block 410). For example, the core network device may obtain a message that includes service parameter data associated with an application, as described above. In some implementations, the service parameter data indicates a revalidation time.

As further shown in FIG. 4, process 400 may include generating, based on the service parameter data, a user equipment route selection policy (URSP) rule associated with the application (block 420). For example, the core network device may generate, based on the service parameter data, a user equipment route selection policy (URSP) rule associated with the application, as described above. In some implementations, the URSP rule includes the revalidation time indicated by the service parameter data. In some implementations, the URSP rule expires at the revalidation time.

As further shown in FIG. 4, process 400 may include transmitting the URSP rule for a user equipment (UE) that executes the application (block 430). For example, the core network device may transmit the URSP rule for a user equipment (UE) that executes the application, as described above.

As further shown in FIG. 4, process 400 may include receiving a state indication message associated with the UE that is triggered at a revalidation time (block 440). For example, the core network device may receive a state indication message associated with the UE that is triggered at the revalidation time, as described above. As an example, process 400 may include determining, by the core network device, whether to revalidate the URSP rule based on the state indication message associated with the UE, and performing, by the core network device, an action based on determining whether to revalidate the URSP rule.

For example, the action may comprise determining that the URSP rule is expired based on a current time being equal to or later than the revalidation time, deleting the URSP rule, generating a new URSP rule, and providing the new URSP rule for the UE. In some implementations, process 400 includes analyzing, by the core network device, subscriber data associated with the UE, and generating the new URSP rule based on the subscriber data associated with the UE.

As another example, the core network device may determine that the URSP rule is expired based on a current time being equal to or later than the revalidation time, may delete the URSP rule, and may generate a new URSP rule. The new URSP rule may be associated with quality of service parameters that are different than quality of service parameters associated with the URSP rule, and providing the new URSP rule for the UE. In some implementations, the message that includes the service parameter data associated with the application is based on a modification to subscriber data associated with the UE. As an example, the message may be based on an AF communication (e.g., from the AF 108).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   obtaining, by a network device, a message that includes service parameter data associated with an application, wherein the service parameter data indicates a revalidation time;
   generating, by the network device and based on the service parameter data, a user equipment (UE) route selection policy (URSP) rule associated with the application,
      wherein the URSP rule includes the revalidation time indicated by the service parameter data, and
      wherein the URSP rule expires at the revalidation time;
   transmitting, by the network device, the URSP rule for a UE that executes the application; and
   receiving, by the network device, a state indication message associated with the UE that is triggered at the revalidation time.

2. The method of claim 1, further comprising:
   determining, by the network device, whether to revalidate the URSP rule based on the state indication message associated with the UE; and
   performing, by the network device, an action based on determining whether to revalidate the URSP rule.

3. The method of claim 2, wherein performing, by the network device, the action comprises:
   determining, by the network device, that the URSP rule is expired based on a current time being later than the revalidation time;
   deleting, by the network device, the URSP rule;
   generating, by the network device, a new URSP rule; and
   providing, by the network device, the new URSP rule for the UE.

4. The method of claim 3, further comprising:
   analyzing, by the network device, subscriber data associated with the UE; and
   generating, by the network device, the new URSP rule based on the subscriber data associated with the UE.

5. The method of claim 2, wherein performing, by the network device, the action comprises:
   determining, by the network device, that the URSP rule is expired based on a current time being later than the revalidation time;
   deleting, by the network device, the URSP rule;
   generating a new URSP rule,
      wherein the new URSP rule is associated with quality of service parameters that are different than quality of service parameters associated with the URSP rule; and
   providing, by the network device, the new URSP rule for the UE.

6. The method of claim 1, wherein the message that includes the service parameter data associated with the application is based on a modification to subscriber data associated with the UE.

7. The method of claim 1, wherein the message is based on an application function (AF) communication.

8. A network device, comprising:
   one or more processors configured to:
      obtain a message that indicates a revalidation time associated with an application;
      generate a user equipment route selection policy (URSP) rule associated with the application,
         wherein the URSP rule includes the revalidation time associated with the application, and
         wherein the URSP rule expires at the revalidation time;
      transmit the URSP rule for a UE that executes the application; and
      receive a state indication message associated with the UE that is triggered at the revalidation time.

9. The network device of claim 8, wherein the one or more processors are further configured to:
   determine whether to revalidate the URSP rule based on the state indication message associated with the UE; and
   perform an action based on determining whether to revalidate the URSP rule.

10. The network device of claim 9, wherein the URSP rule includes a first one or more route selection descriptors that influence traffic routing associated with the application, and
   wherein the one or more processors are further configured to:
      determine that the URSP rule is expired based on a current time being later than the revalidation time;
      delete the URSP rule;
      generate a new URSP rule,
         wherein the new URSP rule includes a second one or more route selection descriptors that influence traffic routing associated with the application that are different than the first one or more route selection descriptors; and
      provide the new URSP rule for the UE.

11. The network device of claim 8, wherein the one or more processors are further configured to:
   determine that the URSP rule is expired based on a current time being later than the revalidation time;
   delete the URSP rule;
   generate a new URSP rule; and
   provide the new URSP rule for the UE.

12. The network device of claim 11, wherein the new URSP rule is based on subscriber data associated with the application.

13. The network device of claim 8, wherein the message that indicates the revalidation time associated with the application is based on a modification to data associated with the application.

14. The network device of claim 8, wherein the message is based on an application function (AF) communication.

15. A non-transitory computer-readable medium storing a set of instructions, the set of instructions comprising:
   one or more instructions that, when executed by one or more processors of a network device, cause the network device to:
      obtain a message that includes service parameter data associated with an application,
         wherein the service parameter data indicates a revalidation time;
      generate a user equipment (UE) route selection policy (URSP) rule associated with the application,
         wherein the URSP rule includes the revalidation time associated with the application, and wherein the URSP rule expires at the revalidation time;
transmit the URSP rule for a UE that executes the application; and
receive a state indication message associated with the UE that is triggered at the revalidation time.

16. The non-transitory computer-readable medium of claim 15, wherein the one or more instructions, when executed by the one or more processors, further cause the network device to:
determine whether to revalidate the URSP rule based on the state indication message associated with the UE; and
perform an action based on determining whether to revalidate the URSP rule.

17. The non-transitory computer-readable medium of claim 15, wherein the one or more instructions, when executed by the one or more processors, further cause the network device to:
determine that the URSP rule is expired based on a current time being later than the revalidation time;
delete the URSP rule;
generate a new URSP rule; and
provide the new URSP rule for the UE.

18. The non-transitory computer-readable medium of claim 17, wherein the new URSP rule is based on subscriber data associated with the application.

19. The non-transitory computer-readable medium of claim 15, wherein the message that includes the service parameter data associated with the application is based on a modification to subscriber data associated with the application.

20. The non-transitory computer-readable medium of claim 15, wherein the message is based on an application function (AF) communication.

* * * * *